United States Patent
Petrisor

(10) Patent No.: US 8,424,045 B2
(45) Date of Patent: Apr. 16, 2013

(54) VIDEO DISPLAY UNIT DOCKING ASSEMBLY FOR FIBER-TO-THE-SCREEN INFLIGHT ENTERTAINMENT SYSTEM

(75) Inventor: Gregory C. Petrisor, Los Angeles, CA (US)

(73) Assignee: Lumexis Corporation, Irvine, CA (US)

( * ) Notice: Subject to any disclaimer, the term of this patent is extended or adjusted under 35 U.S.C. 154(b) by 65 days.

(21) Appl. No.: 12/856,487

(22) Filed: Aug. 13, 2010

(65) Prior Publication Data

US 2011/0065303 A1    Mar. 17, 2011

Related U.S. Application Data

(60) Provisional application No. 61/274,292, filed on Aug. 14, 2009.

(51) Int. Cl.
*H04N 7/18* (2006.01)

(52) U.S. Cl.
USPC .................. 725/76; 725/74; 725/75; 725/77

(58) Field of Classification Search ............... 725/74–77
See application file for complete search history.

(56) References Cited

U.S. PATENT DOCUMENTS

| | | | |
|---|---|---|---|
| 3,964,826 A | 6/1976 | Joseph et al. | |
| 4,337,909 A | 7/1982 | Harja | |
| 4,408,144 A | 10/1983 | Lukes | |
| 4,433,301 A | 2/1984 | Lukes | |
| 4,433,344 A | 2/1984 | Gradin et al. | |
| 4,467,381 A | 8/1984 | Harjo | |
| 4,577,191 A | 3/1986 | Pargee, Jr. | |
| 4,639,106 A | 1/1987 | Gradin | |
| 4,827,252 A | 5/1989 | Busbridge et al. | |
| 4,828,378 A | 5/1989 | Ellis | |

(Continued)

FOREIGN PATENT DOCUMENTS

| | | |
|---|---|---|
| CN | 1048478 | 1/1991 |
| EP | 1469652 | 10/2004 |

(Continued)

OTHER PUBLICATIONS

Chinese First Office Action re App. No. 200680034350.3, dated Jul. 10, 2009.

(Continued)

*Primary Examiner* — Pankaj Kumar
*Assistant Examiner* — Mulugeta Mengesha
(74) *Attorney, Agent, or Firm* — Knobbe, Martens, Olson & Bear, LLP

(57) ABSTRACT

A Video Display Unit (VDU) docking system for a dedicated fiber optic in-flight-entertainment (IFE) system allows VDUs to be quickly replaced by personnel who do not need specialized training in fiber coupling without risk of damage to fiber optic components of the dedicated fiber optic IFE system. In some embodiments, a VDU docking station is configured to receive a VDU such that when a VDU is inserted therein, the VDU becomes automatically communicatively coupled with a fiber optic distribution network of the IFE system via a blind mate connection. In some arrangements, a blank LRU having no operative user interface elements but sufficient functionality to maintain communicative coupling is mounted in the VDU docking station in lieu of a VDU. In some configurations, the VDU docking station includes an embedded switch for maintaining communicative coupling across the VDU docking station in the absence of a VDU.

21 Claims, 12 Drawing Sheets

U.S. PATENT DOCUMENTS

| | | | |
|---|---|---|---|
| 4,832,449 A | 5/1989 | Mundy et al. |
| 4,833,333 A | 5/1989 | Rand |
| 4,833,337 A | 5/1989 | Kelley et al. |
| 4,894,818 A | 1/1990 | Fujioka et al. |
| 4,903,017 A | 2/1990 | Wooler |
| 4,946,129 A | 8/1990 | Eastwick |
| 4,952,809 A | 8/1990 | McEwen |
| 4,958,381 A | 9/1990 | Toyoshima |
| 4,969,724 A | 11/1990 | Ellis |
| 4,993,788 A | 2/1991 | Steward |
| 4,994,794 A | 2/1991 | Price et al. |
| 5,007,699 A | 4/1991 | Stout |
| 5,014,342 A | 5/1991 | Pudsey |
| 5,056,737 A | 10/1991 | Taylor |
| 5,059,781 A | 10/1991 | Langdon |
| 5,076,524 A | 12/1991 | Reh et al. |
| 5,093,567 A | 3/1992 | Staveley |
| 5,096,271 A | 3/1992 | Portman |
| 5,121,702 A | 6/1992 | Johnson et al. |
| 5,123,728 A | 6/1992 | Gradin et al. |
| 5,132,527 A | 7/1992 | Karpati |
| 5,150,122 A | 9/1992 | Bell |
| 5,179,447 A | 1/1993 | Lain |
| 5,181,013 A | 1/1993 | Bagshaw et al. |
| 5,181,771 A | 1/1993 | Robak et al. |
| 5,184,231 A | 2/1993 | Ellis |
| 5,200,757 A | 4/1993 | Jairam |
| 5,203,220 A | 4/1993 | Lerman |
| 5,208,938 A | 5/1993 | Webb |
| 5,210,409 A | 5/1993 | Rowe |
| 5,220,456 A | 6/1993 | Haessig, Jr. |
| 5,222,780 A | 6/1993 | Reh et al. |
| 5,262,762 A | 11/1993 | Westover et al. |
| 5,267,775 A | 12/1993 | Nguyen |
| 5,289,196 A | 2/1994 | Gans et al. |
| 5,307,206 A | 4/1994 | Haessig, Jr. |
| 5,311,302 A | 5/1994 | Berry et al. |
| 5,333,002 A | 7/1994 | Gans et al. |
| 5,341,140 A | 8/1994 | Perry |
| 5,344,210 A | 9/1994 | Marwan et al. |
| 5,353,109 A | 10/1994 | Langdon et al. |
| 5,369,355 A | 11/1994 | Roe |
| 5,374,103 A | 12/1994 | Stange et al. |
| 5,398,991 A | 3/1995 | Smith et al. |
| 5,400,079 A | 3/1995 | Martinez et al. |
| 5,421,530 A | 6/1995 | Bertagna et al. |
| 5,440,337 A | 8/1995 | Henderson et al. |
| 5,442,556 A | 8/1995 | Boyes et al. |
| 5,467,106 A | 11/1995 | Salomon |
| 5,481,868 A | 1/1996 | Davies et al. |
| 5,517,508 A | 5/1996 | Scott |
| 5,523,551 A | 6/1996 | Scott |
| 5,529,265 A | 6/1996 | Sakurai |
| 5,535,884 A | 7/1996 | Scott et al. |
| 5,539,560 A | 7/1996 | Dennis et al. |
| 5,539,657 A | 7/1996 | Utsumi et al. |
| 5,543,818 A | 8/1996 | Scott |
| 5,548,356 A | 8/1996 | Portman |
| 5,568,484 A | 10/1996 | Margis |
| 5,574,497 A | 11/1996 | Henderson et al. |
| 5,577,205 A | 11/1996 | Hwang et al. |
| 5,583,674 A | 12/1996 | Mosley |
| 5,596,647 A | 1/1997 | Wakai et al. |
| 5,601,208 A | 2/1997 | Scott |
| 5,636,055 A | 6/1997 | Portman et al. |
| 5,638,236 A | 6/1997 | Scott |
| 5,640,297 A | 6/1997 | Labaze |
| 5,641,092 A | 6/1997 | Scott |
| 5,647,505 A | 7/1997 | Scott |
| 5,648,904 A | 7/1997 | Scott |
| 5,666,291 A | 9/1997 | Scott et al. |
| 5,675,752 A | 10/1997 | Scott et al. |
| 5,704,798 A | 1/1998 | Portman et al. |
| 5,705,860 A | 1/1998 | Ninh et al. |
| 5,731,782 A | 3/1998 | Walls |
| 5,738,392 A | 4/1998 | Portman |
| 5,786,801 A | 7/1998 | Ichise |
| 5,786,917 A | 7/1998 | Maeno |
| 5,790,787 A | 8/1998 | Scott et al. |
| 5,793,330 A | 8/1998 | Gans et al. |
| 5,796,185 A | 8/1998 | Takata et al. |
| 5,801,749 A | 9/1998 | Ninh et al. |
| 5,805,821 A | 9/1998 | Wang et al. |
| 5,811,791 A | 9/1998 | Portman |
| 5,812,778 A | 9/1998 | Peters et al. |
| 5,813,048 A | 9/1998 | Thom |
| 5,826,091 A | 10/1998 | Shah et al. |
| 5,831,805 A | 11/1998 | Sekine et al. |
| 5,835,127 A | 11/1998 | Booth et al. |
| 5,838,802 A | 11/1998 | Swinbanks |
| 5,847,522 A | 12/1998 | Barba |
| 5,848,235 A | 12/1998 | Scott et al. |
| 5,848,367 A | 12/1998 | Lotocky et al. |
| 5,854,591 A | 12/1998 | Atkinson |
| 5,857,869 A | 1/1999 | Parcel et al. |
| 5,859,616 A | 1/1999 | Gans et al. |
| 5,871,173 A | 2/1999 | Frank et al. |
| 5,872,934 A | 2/1999 | Whitehouse et al. |
| 5,881,228 A | 3/1999 | Atkinson et al. |
| 5,884,096 A | 3/1999 | Seifert et al. |
| 5,889,466 A | 3/1999 | Ferguson |
| 5,889,775 A | 3/1999 | Sawicz et al. |
| 5,892,478 A | 4/1999 | Moss |
| 5,894,413 A | 4/1999 | Ferguson |
| 5,896,129 A | 4/1999 | Murphy et al. |
| 5,898,401 A | 4/1999 | Walls |
| 5,907,827 A | 5/1999 | Fang et al. |
| 5,910,814 A | 6/1999 | Portman et al. |
| 5,910,966 A | 6/1999 | Sekine et al. |
| 5,914,576 A | 6/1999 | Barba |
| 5,920,186 A | 7/1999 | Ninh et al. |
| 5,923,673 A | 7/1999 | Henrikson |
| 5,923,743 A | 7/1999 | Sklar |
| 5,926,759 A | 7/1999 | Severwright |
| 5,929,895 A | 7/1999 | Berry et al. |
| 5,939,997 A | 8/1999 | Sekine et al. |
| 5,942,811 A | 8/1999 | Stumfall et al. |
| 5,944,803 A | 8/1999 | Whitehouse |
| 5,945,631 A | 8/1999 | Henrikson et al. |
| 5,953,429 A | 9/1999 | Wakai et al. |
| 5,957,798 A | 9/1999 | Smith, III et al. |
| 5,963,877 A | 10/1999 | Kobayashi |
| 5,973,722 A | 10/1999 | Wakai et al. |
| 5,978,736 A | 11/1999 | Greendale |
| 5,986,810 A | 11/1999 | Webb |
| 5,991,138 A | 11/1999 | Sklar et al. |
| 5,999,520 A | 12/1999 | Little |
| 6,008,779 A | 12/1999 | Ellis |
| 6,011,322 A | 1/2000 | Stumfall et al. |
| 6,014,381 A | 1/2000 | Troxel et al. |
| 6,031,299 A | 2/2000 | Stumfall et al. |
| 6,034,688 A | 3/2000 | Greenwood et al. |
| 6,038,426 A | 3/2000 | Williams, Jr. |
| 6,052,426 A | 4/2000 | Maurice |
| 6,055,634 A | 4/2000 | Severwright |
| 6,057,875 A | 5/2000 | Ferguson et al. |
| 6,058,288 A | 5/2000 | Reed et al. |
| 6,092,868 A | 7/2000 | Wynn |
| 6,110,261 A | 8/2000 | Guiragossian |
| 6,130,636 A | 10/2000 | Severwright |
| 6,131,119 A | 10/2000 | Fukui |
| 6,134,674 A | 10/2000 | Akasheh |
| 6,154,910 A | 12/2000 | Corney |
| 6,157,471 A | 12/2000 | Bignolles et al. |
| 6,160,591 A | 12/2000 | Stumfall et al. |
| 6,163,823 A | 12/2000 | Henrikson |
| 6,185,643 B1 | 2/2001 | Asprey et al. |
| 6,189,127 B1 | 2/2001 | Fang et al. |
| 6,195,040 B1 | 2/2001 | Arethens |
| 6,208,307 B1 | 3/2001 | Frisco et al. |
| 6,249,913 B1 | 6/2001 | Galipeau et al. |
| 6,266,736 B1 | 7/2001 | Atkinson et al. |
| 6,266,815 B1 | 7/2001 | Shen et al. |
| 6,272,572 B1 | 8/2001 | Backhaus et al. |
| 6,310,286 B1 | 10/2001 | Troxel et al. |
| 6,359,608 B1 | 3/2002 | Lebrun et al. |
| 6,373,216 B1 | 4/2002 | Ho |

| | | |
|---|---|---|
| 6,390,920 B1 | 5/2002 | Infiesto et al. |
| 6,452,155 B1 | 9/2002 | Sherlock et al. |
| 6,453,259 B1 | 9/2002 | Infiesto |
| 6,453,267 B1 | 9/2002 | Rudzik et al. |
| 6,457,837 B1 | 10/2002 | Steffensmeier |
| 6,466,258 B1 | 10/2002 | Mogenis et al. |
| 6,477,152 B1 | 11/2002 | Hiett |
| 6,490,510 B1 | 12/2002 | Choisnet |
| 6,493,147 B1 | 12/2002 | Baudou et al. |
| 6,499,027 B1 | 12/2002 | Weinberger |
| 6,507,952 B1 | 1/2003 | Miller et al. |
| 6,520,015 B1 | 2/2003 | Alause et al. |
| 6,535,490 B1 | 3/2003 | Jain |
| D473,233 S | 4/2003 | Politzer |
| 6,549,754 B1 | 4/2003 | Miller et al. |
| 6,556,114 B1 | 4/2003 | Guillemin et al. |
| 6,561,006 B1 | 5/2003 | Roberge et al. |
| 6,588,117 B1 | 7/2003 | Martin et al. |
| 6,611,311 B1 | 8/2003 | Kretz et al. |
| 6,612,870 B1 | 9/2003 | Rauscent |
| 6,614,126 B1 | 9/2003 | Mitchell |
| 6,633,156 B1 | 10/2003 | Choisnet |
| 6,654,806 B2 | 11/2003 | Wall et al. |
| 6,661,353 B1 | 12/2003 | Gopen |
| 6,661,664 B2 | 12/2003 | Sarno et al. |
| 6,679,112 B2 | 1/2004 | Collot et al. |
| 6,681,250 B1 | 1/2004 | Thomas et al. |
| 6,698,281 B1 | 3/2004 | Choisnet |
| 6,715,150 B1 | 4/2004 | Potin |
| 6,735,309 B1 | 5/2004 | Lemanski et al. |
| 6,741,841 B1 | 5/2004 | Mitchell |
| 6,754,609 B2 | 6/2004 | Lescourret |
| 6,756,304 B1 | 6/2004 | Robert |
| 6,775,462 B1 | 8/2004 | Wang et al. |
| 6,782,392 B1 | 8/2004 | Weinberger et al. |
| 6,801,769 B1 | 10/2004 | Royalty |
| 6,806,885 B1 | 10/2004 | Piper et al. |
| 6,807,148 B1 | 10/2004 | Eicher |
| 6,807,538 B1 | 10/2004 | Weinberger et al. |
| 6,810,527 B1 | 10/2004 | Conrad et al. |
| 6,811,348 B1 | 11/2004 | Meyer et al. |
| 6,812,992 B2 | 11/2004 | Nemeth |
| 6,813,777 B1 | 11/2004 | Weinberger et al. |
| 6,815,716 B2 | 11/2004 | Sanson et al. |
| 6,817,240 B2 | 11/2004 | Collot et al. |
| 6,822,812 B1 | 11/2004 | Brauer |
| 6,824,317 B2 | 11/2004 | Finizio et al. |
| D499,402 S | 12/2004 | Boyer et al. |
| 6,844,874 B2 | 1/2005 | Maurice |
| 6,845,658 B2 | 1/2005 | Roberge et al. |
| D503,707 S | 4/2005 | Boyer, Jr. |
| 6,876,905 B2 | 4/2005 | Farley et al. |
| 6,894,490 B2 | 5/2005 | Lescourret |
| 6,899,390 B2 | 5/2005 | Sanfrod et al. |
| D506,733 S | 6/2005 | Boyer, Jr. |
| 6,918,294 B1 | 7/2005 | Roberge |
| 6,919,874 B1 | 7/2005 | Maurice |
| 6,924,785 B1 | 8/2005 | Kretz et al. |
| 6,937,194 B1 | 8/2005 | Meier et al. |
| 6,938,258 B1 | 8/2005 | Weinberger et al. |
| 6,956,680 B2 | 10/2005 | Morvieu et al. |
| 6,972,747 B2 | 12/2005 | Bayot et al. |
| 6,973,479 B2 | 12/2005 | Brady, Jr. et al. |
| 6,977,638 B1 | 12/2005 | Bayot et al. |
| 7,028,304 B1 | 4/2006 | Weinberger et al. |
| 7,040,697 B1 | 5/2006 | Tuccinardi et al. |
| 7,042,528 B2 | 5/2006 | Lester et al. |
| 7,068,712 B1 | 6/2006 | Zang et al. |
| 7,076,724 B2 | 7/2006 | Cole et al. |
| 7,088,525 B2 | 8/2006 | Finizio et al. |
| 7,090,128 B2 | 8/2006 | Farley et al. |
| 7,102,691 B2 | 9/2006 | Dischert et al. |
| 7,113,978 B2 | 9/2006 | Beasley et al. |
| 7,114,171 B2 | 9/2006 | Brady et al. |
| 7,124,426 B1 | 10/2006 | Tsuria et al. |
| 7,177,638 B2 | 2/2007 | Funderburk et al. |
| 7,187,498 B2 | 3/2007 | Bengoechea et al. |
| 7,199,396 B2 | 4/2007 | Lebrun |
| 7,200,229 B2 | 4/2007 | Spring et al. |
| 7,213,055 B1 | 5/2007 | Kathol |
| 7,216,296 B2 | 5/2007 | Broberg et al. |
| 7,249,167 B1 | 7/2007 | Liaw et al. |
| 7,269,761 B2 | 9/2007 | Yi |
| 7,280,134 B1 | 10/2007 | Henderson et al. |
| 7,280,825 B2 | 10/2007 | Keen et al. |
| 7,286,289 B2 | 10/2007 | Bengoechea et al. |
| 7,289,499 B1 | 10/2007 | Chinn et al. |
| 7,330,649 B2 | 2/2008 | Finizio et al. |
| 7,337,043 B2 | 2/2008 | Bull |
| 7,343,157 B1 | 3/2008 | Mitchell |
| 7,344,102 B1 | 3/2008 | Royer et al. |
| D566,032 S | 4/2008 | Berthou et al. |
| 7,352,929 B2 | 4/2008 | Hagen et al. |
| 7,403,780 B2 | 7/2008 | VanLaningham et al. |
| 7,405,773 B2 | 7/2008 | Lester et al. |
| 7,438,511 B2 | 10/2008 | Legeay |
| 7,483,382 B1 | 1/2009 | Toillon et al. |
| 7,483,696 B1 | 1/2009 | Mitchell |
| 7,486,960 B2 | 2/2009 | Brady, Jr. et al. |
| 7,487,938 B2 | 2/2009 | Brady, Jr. et al. |
| 7,496,361 B1 | 2/2009 | Mitchell et al. |
| 7,565,143 B2 | 7/2009 | Takeuchi et al. |
| 7,566,254 B2 | 7/2009 | Sampica et al. |
| 7,580,528 B2 | 8/2009 | Farley et al. |
| 7,587,733 B2 | 9/2009 | Keen et al. |
| 7,587,734 B2 * | 9/2009 | Logan et al. .................. 725/76 |
| 7,599,691 B1 | 10/2009 | Mitchell |
| 7,600,248 B1 | 10/2009 | Berry |
| 7,619,422 B2 | 11/2009 | Tsamis et al. |
| 7,620,364 B2 | 11/2009 | Higashida et al. |
| 7,621,770 B1 | 11/2009 | Finizio et al. |
| 7,628,357 B2 | 12/2009 | Mercier et al. |
| D607,800 S | 1/2010 | Canal et al. |
| D607,801 S | 1/2010 | Canal et al. |
| 7,642,974 B2 | 1/2010 | Brady, Jr. et al. |
| 7,649,696 B2 | 1/2010 | Finizio et al. |
| 7,675,849 B2 | 3/2010 | Watson et al. |
| 7,676,225 B2 | 3/2010 | Funderburk et al. |
| 7,680,092 B2 | 3/2010 | VanLaningham et al. |
| 7,715,783 B2 | 5/2010 | Girard et al. |
| 7,725,569 B2 | 5/2010 | Brady, Jr. et al. |
| 7,792,189 B2 | 9/2010 | Finizio et al. |
| 7,808,891 B2 | 10/2010 | Law et al. |
| 7,830,781 B2 | 11/2010 | Zogg et al. |
| 7,836,472 B2 | 11/2010 | Brady, Jr. et al. |
| 7,843,554 B2 | 11/2010 | Koenck et al. |
| 7,859,995 B2 | 12/2010 | Bejerano et al. |
| 7,876,688 B2 | 1/2011 | Hauenstein et al. |
| 8,184,974 B2 | 5/2012 | Cline |
| 2002/0045484 A1 | 4/2002 | Eck et al. |
| 2002/0046300 A1 | 4/2002 | Hanko et al. |
| 2002/0063924 A1 | 5/2002 | Kimbrough et al. |
| 2002/0180904 A1 | 12/2002 | Lauzun et al. |
| 2003/0016806 A1 | 1/2003 | Emerson |
| 2003/0021241 A1 | 1/2003 | Dame et al. |
| 2003/0033459 A1 | 2/2003 | Garnett |
| 2003/0064714 A1 | 4/2003 | Sanford et al. |
| 2003/0085818 A1 | 5/2003 | Renton et al. |
| 2003/0088360 A1 | 5/2003 | Ikhlef et al. |
| 2003/0093798 A1 | 5/2003 | Rogerson |
| 2003/0107248 A1 | 6/2003 | Sanford et al. |
| 2003/0110466 A1 | 6/2003 | Dricot et al. |
| 2003/0184957 A1 | 10/2003 | Stahl et al. |
| 2003/0217363 A1 | 11/2003 | Brady et al. |
| 2004/0052372 A1 | 3/2004 | Jakoubek |
| 2004/0081083 A1 | 4/2004 | Sekihata |
| 2004/0217976 A1 | 11/2004 | Sanford |
| 2004/0235469 A1 | 11/2004 | Krug |
| 2005/0044186 A1 | 2/2005 | Petrisor |
| 2005/0044564 A1 | 2/2005 | Stopniewicz et al. |
| 2005/0053237 A1 | 3/2005 | Hanson |
| 2005/0055228 A1 | 3/2005 | Boyer et al. |
| 2005/0055278 A1 | 3/2005 | Boyer |
| 2005/0132407 A1 | 6/2005 | Boyer, Jr. et al. |
| 2005/0177763 A1 | 8/2005 | Stoler |
| 2005/0193257 A1 | 9/2005 | Stoler |
| 2005/0200697 A1 * | 9/2005 | Schedivy et al. ................ 348/61 |
| 2005/0216938 A1 | 9/2005 | Brady, Jr. et al. |

| | | |
|---|---|---|
| 2005/0256616 A1 | 11/2005 | Rhoads |
| 2005/0268319 A1 | 12/2005 | Brady, Jr. et al. |
| 2005/0278753 A1 | 12/2005 | Brady, Jr. et al. |
| 2005/0278754 A1 | 12/2005 | Bleacher et al. |
| 2006/0107295 A1* | 5/2006 | Margis et al. .................. 725/81 |
| 2006/0143660 A1* | 6/2006 | Logan et al. .................. 725/76 |
| 2006/0143661 A1 | 6/2006 | Funderburk et al. |
| 2006/0143662 A1 | 6/2006 | Esterling et al. |
| 2006/0174285 A1* | 8/2006 | Brady et al. .................. 725/76 |
| 2006/0179457 A1 | 8/2006 | Brady, Jr. et al. |
| 2006/0184583 A1 | 8/2006 | Renton et al. |
| 2006/0194575 A1* | 8/2006 | Stadelmeier et al. ...... 455/426.1 |
| 2006/0277589 A1 | 12/2006 | Margis et al. |
| 2006/0291803 A1 | 12/2006 | Watson et al. |
| 2007/0044126 A1 | 2/2007 | Mitchell |
| 2007/0077998 A1* | 4/2007 | Petrisor .......................... 463/42 |
| 2007/0130591 A1* | 6/2007 | Brady et al. .................... 725/76 |
| 2007/0164609 A1* | 7/2007 | Shalam et al. ............... 307/10.1 |
| 2007/0280199 A1 | 12/2007 | Rong |
| 2007/0292108 A1 | 12/2007 | Reichert et al. |
| 2007/0294732 A1 | 12/2007 | Brady et al. |
| 2008/0023600 A1 | 1/2008 | Perlman |
| 2008/0040756 A1 | 2/2008 | Perlman et al. |
| 2008/0050512 A1 | 2/2008 | Lower et al. |
| 2008/0056178 A1 | 3/2008 | Alexander et al. |
| 2008/0063398 A1* | 3/2008 | Cline .............................. 398/66 |
| 2008/0089658 A1 | 4/2008 | Grady et al. |
| 2008/0105784 A1 | 5/2008 | Barroca |
| 2008/0142585 A1 | 6/2008 | Foreman et al. |
| 2008/0157997 A1 | 7/2008 | Bleacher et al. |
| 2008/0159174 A1 | 7/2008 | Enomoto et al. |
| 2008/0187282 A1 | 8/2008 | Brady et al. |
| 2008/0189748 A1 | 8/2008 | Bleacher et al. |
| 2008/0237440 A1 | 10/2008 | Lester et al. |
| 2008/0240029 A1 | 10/2008 | Lynch et al. |
| 2008/0240038 A1 | 10/2008 | Lynch et al. |
| 2008/0240061 A1 | 10/2008 | Lynch et al. |
| 2008/0240062 A1 | 10/2008 | Lynch et al. |
| 2008/0244664 A1 | 10/2008 | Hong et al. |
| 2008/0259023 A1 | 10/2008 | Chang |
| 2008/0285459 A1 | 11/2008 | Diab et al. |
| 2008/0310609 A1 | 12/2008 | Brady, Jr. et al. |
| 2008/0312778 A1 | 12/2008 | Correa et al. |
| 2008/0313259 A1 | 12/2008 | Correa et al. |
| 2009/0007193 A1 | 1/2009 | Correa et al. |
| 2009/0007194 A1 | 1/2009 | Brady, Jr. et al. |
| 2009/0034540 A1 | 2/2009 | Law |
| 2009/0068474 A1 | 3/2009 | Lower et al. |
| 2009/0077595 A1 | 3/2009 | Sizelove et al. |
| 2009/0079705 A1 | 3/2009 | Sizelove et al. |
| 2009/0081947 A1 | 3/2009 | Margis |
| 2009/0083805 A1 | 3/2009 | Sizelove et al. |
| 2009/0094635 A1 | 4/2009 | Aslin et al. |
| 2009/0096857 A1 | 4/2009 | Frisco et al. |
| 2009/0100476 A1* | 4/2009 | Frisco et al. .................. 725/68 |
| 2009/0119721 A1 | 5/2009 | Perlman et al. |
| 2009/0202241 A1 | 8/2009 | Yu et al. |
| 2009/0228908 A1 | 9/2009 | Margis et al. |
| 2009/0243352 A1 | 10/2009 | Cailleteau |
| 2009/0246355 A9 | 10/2009 | Lower et al. |
| 2009/0262290 A1 | 10/2009 | Sampica et al. |
| 2009/0279257 A1 | 11/2009 | Lower et al. |
| 2009/0282469 A1 | 11/2009 | Lynch et al. |
| 2010/0008503 A1 | 1/2010 | Farley et al. |
| 2010/0013279 A1 | 1/2010 | Cailleteau |
| 2010/0027461 A1 | 2/2010 | Bothorel |
| 2010/0028019 A1* | 2/2010 | Yu et al. ....................... 398/141 |
| 2010/0032999 A1 | 2/2010 | Petitpierre |
| 2010/0060739 A1 | 3/2010 | Salazar |
| 2010/0064327 A1 | 3/2010 | Lynch et al. |
| 2010/0066616 A1 | 3/2010 | Brady, Jr. et al. |
| 2010/0088731 A1 | 4/2010 | Vanyek |
| 2010/0098418 A1 | 4/2010 | Bouet et al. |
| 2010/0138581 A1 | 6/2010 | Bird et al. |
| 2010/0138582 A1 | 6/2010 | Bird et al. |
| 2010/0138879 A1 | 6/2010 | Bird et al. |
| 2010/0144267 A1* | 6/2010 | Funderburk et al. ......... 455/3.02 |
| 2010/0152962 A1 | 6/2010 | Bennett et al. |
| 2010/0180299 A1 | 7/2010 | Girard et al. |
| 2010/0189089 A1 | 7/2010 | Lynch et al. |
| 2010/0195634 A1 | 8/2010 | Thompson |
| 2010/0199196 A1 | 8/2010 | Thompson |
| 2010/0205333 A1* | 8/2010 | Francois et al. ................ 710/62 |
| 2011/0063998 A1 | 3/2011 | Petrisor et al. |
| 2011/0107377 A1 | 5/2011 | Petrisor et al. |
| 2011/0162015 A1 | 6/2011 | Holyoake et al. |

FOREIGN PATENT DOCUMENTS

| | | |
|---|---|---|
| GB | 2235800 | 5/1993 |
| WO | WO 90/15508 | 12/1990 |
| WO | WO 98/50848 | 11/1998 |
| WO | WO 02/061594 | 8/2002 |
| WO | WO 02/093925 | 11/2002 |
| WO | WO 2005/004490 | 1/2005 |
| WO | WO 2006/062641 | 6/2006 |
| WO | WO 2007/035739 | 3/2007 |
| WO | WO 2008/033870 | 3/2008 |
| WO | WO 2011/017233 | 2/2011 |
| WO | WO 2011/020071 | 2/2011 |
| WO | WO 2011/022708 | 2/2011 |
| WO | WO 2011/044148 | 4/2011 |

OTHER PUBLICATIONS

Cisco Headquarters, "Guide to ATM Technology", 1999, Cisco Systems, Inc.

Marsh, George, "A380: Jumbo Step for In-Flight-Entertainment", Avionics Magazine, Mar. 1, 2006, http://www.aviationtoday.com/av/categories/commercial/792.html, 3 pages.

PCT International Patentability Report and Written Opinion re App. No. PCT/US2006/036492, dated Mar. 26, 2008.

PCT International Preliminary Report and Written Opinion re App. No. PCT/US2007/078202, dated Mar. 17, 2009.

PCT International Search Report and Written Opinion re App. No. PCT/US 10/46246, date of mailing Nov. 29, 2010.

PCT International Search Report and Written Opinion, re App. No. PCT/US2010/44017, dated Oct. 25, 2010.

PCT International Search Report and Written Opinion, re App. No. PCT/US2010/45538, dated Nov. 12, 2010.

PCT International Search Report re App. No. PCT/US2006/036492, dated Mar. 8, 2007.

PCT International Search Report re App. No. PCT/US2007/078202, dated Oct. 28, 2008.

PCT Search Report re App. No. PCT/US10/51505 dated Dec. 28, 2010.

PCT Search Report re App. No. PCT/US2004/019030, dated Jan. 14, 2005.

International Preliminary Report on Patentability in corresponding International Application No. PCT/US2010/045538, issued Feb. 14, 2012, 6 pages.

Texas Instruments, "IrDA Transceiver with Encoder/Decoder", http://www.ti.com/lit/ds/slus254/slus254.pdf, 1999.

International Preliminary Report on Patentability in corresponding International Application No. PCT/US2010/044017, issued Feb. 16, 2012, 9 pages.

International Preliminary Report on Patentability in corresponding International Application No. PCT/US2010/046246, issued Mar. 1, 2012, 6 pages.

International Preliminary Report on Patentability in corresponding International Application No. PCT/US2010/051505, issued Apr. 11, 2012, 5 pages.

Office Action received in corresponding Chinese Application No. 200680034350.3, mailed Mar. 31, 2012, 9 pages.

* cited by examiner

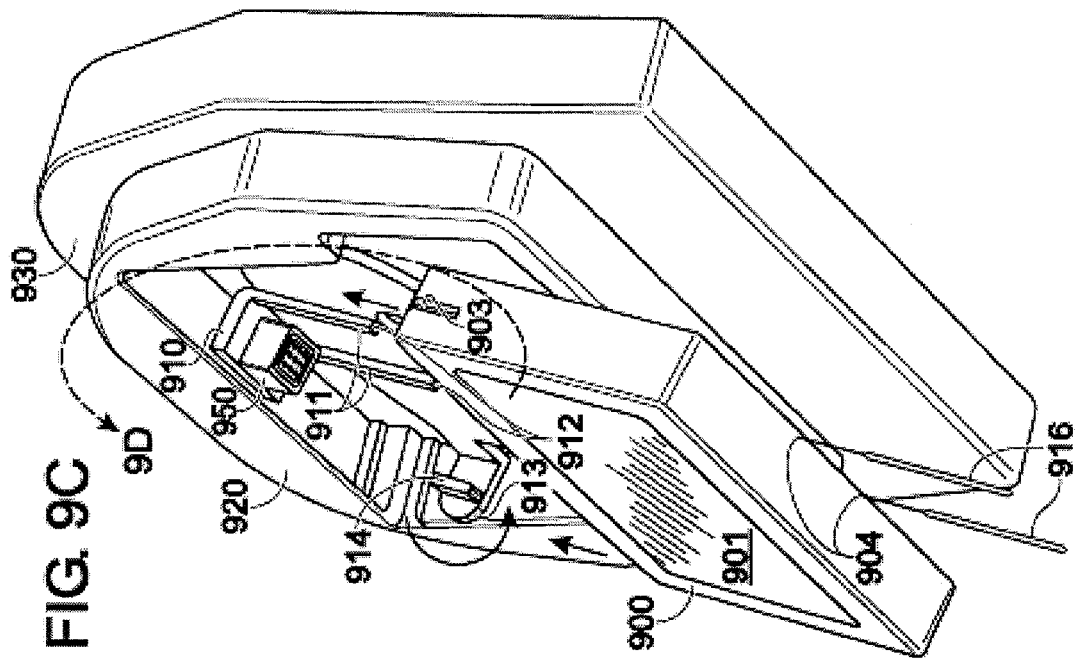
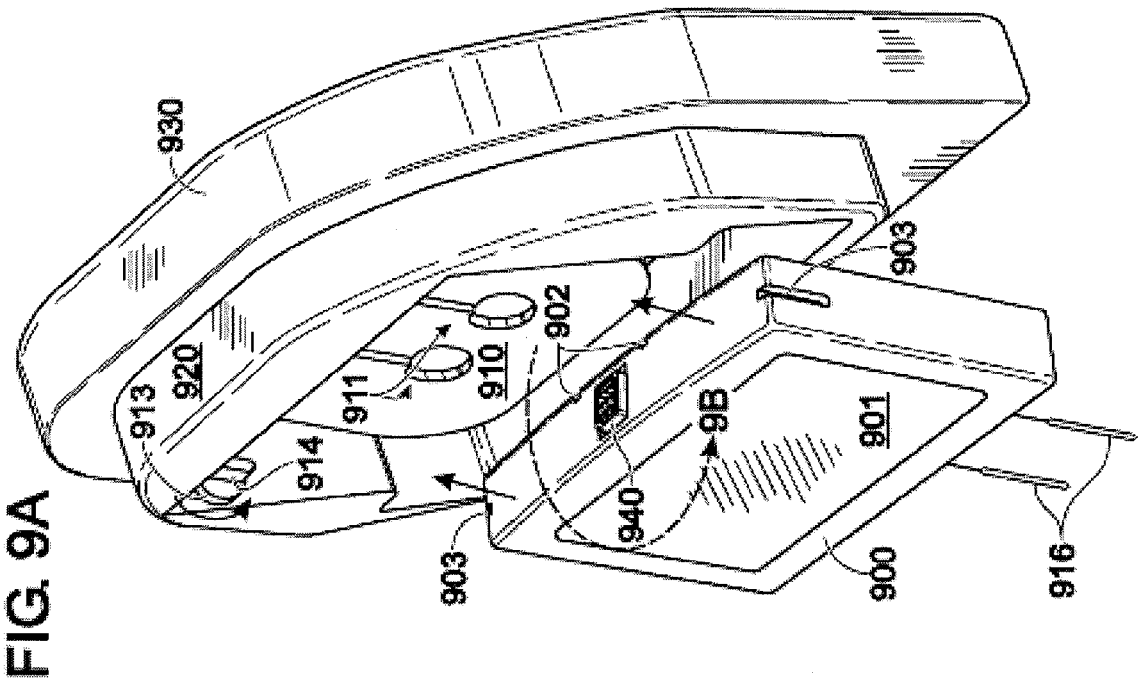

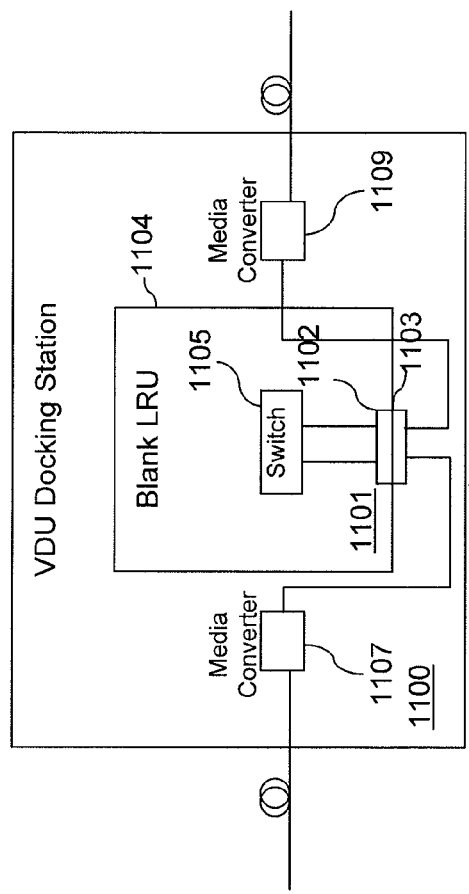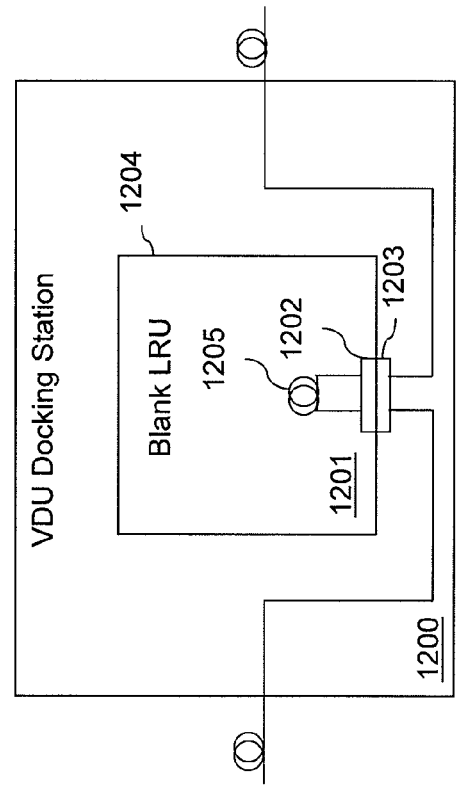

VIDEO DISPLAY UNIT DOCKING ASSEMBLY FOR FIBER-TO-THE-SCREEN INFLIGHT ENTERTAINMENT SYSTEM

CROSS-REFERENCE TO RELATED APPLICATION(S)

This application claims the benefit of U.S. provisional application No. 61/274,292 entitled "PLUGGABLE VIDEO DISPLAY UNIT DOCKING STATION FOR FIBER-TO-THE-SEAT INFLIGHT ENTERTAINMENT SYSTEM," filed on Aug. 14, 2009, the content of which is incorporated herein by reference in its entirety.

BACKGROUND OF THE INVENTION

Inflight entertainment (IFE) systems have evolved significantly over the last 25 years. Prior to 1978, IFE systems consisted audio-only systems. In 1978, Bell and Howell (Avicom Division) introduced a group viewing video system based on VHS tapes. In 1988, Airvision introduced the first in-seat video system allowing passengers to choose between several channels of broadcast video. In 1997, Swissair installed the first interactive video on demand (VOD) system. Currently, several IFE systems provide VOD with full digital video disc-like controls.

In IFE systems, costs are highly dependent on the system's line replaceable units (LRUs). The term "LRU" is a term of art generally describing a complex component (e.g., "black box") on an aircraft that is designed to be replaced quickly on the flight line or airport ramp area. LRUs are beneficial because they are generally self-contained units that can be rapidly swapped-out in the event that maintenance is required thus allowing the airplane to continue to operate with little down time. To be installed on an aircraft, an LRU hardware design configuration must be approved by the Federal Aviation Administration by means defined in Title 14 of the Code of Federal Regulations. LRUs of a particular hardware design configuration may have different software installed. An IFE system's installation costs, operating costs, maintenance costs and passenger comfort depend greatly on the size, form factor, number and weight of its LRUs, as well as the number of distinct LRUs deployed in a single aircraft and across an airline's entire fleet of aircraft.

SUMMARY OF THE INVENTION

The dedicated fiber optic IFE system abstracted in FIG. 1, for example the system marketed under the tradename FIBER-TO-THE-SCREEN™ (FTTS™) by Lumexis, Inc., has provided the airline industry with a modular, scalable, extensible, and future-proofed IFE system that leverages terrestrial VOD hardware and software advances and reduces the number of distinct LRU not only in a single aircraft but across an airline's entire fleet of aircraft (e.g., regional jets to jumbo jets). In this dedicated fiber optic IFE system, head end servers 100 can communicate with video display units (VDUs) 110 over dedicated fiber optic links. Multiplexing can be used to achieve bidirectional communication on a single fiber. This dedicated fiber optic IFE system offers many advantages over traditional IFE systems, such as a significant reduction in the number of distinct LRUs and elimination of active components (e.g. distribution area LRUs) between the head end and the seat end.

The dedicated fiber optic IFE system can be enhanced by the serial networking dedicated fiber optic IFE system abstracted in FIG. 2. In the dedicated fiber optic IFE system illustrated, head end servers 200 communicate with VDUs 210 at the edge of a serial chain of VDUs over a fiber optic link. The edge VDUs 210 communicate with core VDUs 220 in the serial chain over fiber optic links. In this enhanced dedicated fiber optic IFE system, VDU LRUs communicate with the head end over a shared data path of a serial network rather than a dedicated data path, reducing cost relative to the dedicated fiber optic IFE system. Moreover, a backup data path is available in the event of failure of the primary data path, improving system reliability.

A shortcoming of some dedicated fiber optic IFE systems is that each VDU is directly attached to the fiber. Thus, when a VDU fails, personnel having specialized training in fiber coupling are generally called-in between flights to ensure that the failed VDU is detached from the fiber and a replacement VDU is attached to the fiber in a manner that does not damage the fiber. This VDU maintenance paradigm is suboptimal because the VDU is generally the most numerous LRU on an aircraft, is highly visible to passengers, is in high usage by passengers, and is the most likely LRU to fail due to user-induced damage. Moreover, in serial networking dedicated fiber optic IFE systems, a VDU must be installed in every seat of a serial chain of VDUs to maintain communicative coupling across the serial chain, which requires an airline to maintain a full ship set of VDUs and limits the airline's ability to provide differentiated IFE services (e.g. to different classes of passengers or different passengers within a single class).

The present invention, in some aspects, provides a VDU docking assembly for a dedicated fiber optic IFE system that allows VDUs to be quickly replaced by personnel who do not need specialized training in fiber coupling without risk of damage to fiber optic components of the dedicated fiber optic IFE system. These advantages are achieved in these aspects through the expedient of a VDU docking station configured to receive a VDU such that when a VDU is inserted therein, the VDU becomes automatically communicatively coupled with a fiber optic distribution network of the IFE system via a blind mate connection.

In some aspects of the invention, a VDU docking assembly for a dedicated fiber optic IFE system comprises a VDU docking station having a dock, a first electrical connector and a converter communicatively coupled with the first electrical connector; and a VDU having a second electrical connector, wherein the first electrical connector is adapted to blind mate with the second electrical connector upon slidably mounting the VDU to the dock. The converter may comprise a media converter, a fiber optic transceiver, or both a fiber optic transceiver and switch. The converter may be adapted to perform optical-to-electronic conversions on optical signals inbound to the VDU and electronic-to-optical conversions on electronic signals outbound from the VDU. The converter may be adapted to perform physical layer to media access layer and media access layer to physical layer conversions. The converter may receive inline power from the VDU, or the VDU may receive inline power through the first electrical connector.

In other aspects of the invention, a VDU docking assembly for a dedicated fiber optic IFE system comprises a VDU docking station having a dock and a first optical connector; and a VDU having a second optical connector, wherein the first optical connector is adapted to blind mate with the second optical connector upon slidably mounting the VDU to the dock.

In some aspects, the VDU docking assembly may be communicatively coupled with a head end server, serially communicatively coupled between a head end server and a second VDU docking assembly, or serially communicatively coupled between a second VDU docking assembly and a third VDU docking assembly.

In some embodiments, one or each of first and second optical connectors further comprise electrical connective elements adapted to transmit electrical power and/or electronic signals. In some arrangements, the VDU receives inline power through an electrical connective element of the first optical connector.

It may be desirable to reduce the VDU population in a serial networking dedicated fiber optic IFE system to save costs and provide differentiated IFE services. To reduce VDU population, a blank LRU having no operative user interface elements but sufficient functionality to maintain communicative coupling across a VDU docking station may be mounted in the VDU docking station in lieu of a VDU. Therefore, in another aspect of the invention, a VDU docking assembly for a serial networking dedicated fiber optic IFE system comprises a VDU docking station having a dock, a first electrical connector and a converter communicatively coupled with the first electrical connector; and a blank LRU having a second electrical connector, wherein the first electrical connector is adapted to blind mate with the second electrical connector upon slidably mounting the blank LRU to the dock whereby communicative coupling is maintained across the VDU docking station. The blank LRU may comprise a switch adapted to maintain the communicative coupling.

In yet other aspects of the invention, a VDU docking assembly for a serial networking dedicated fiber optic IFE system comprises a VDU docking station having a dock and a first optical connector; and a blank LRU having a second optical connector, wherein the first optical connector is adapted to blind mate with the second optical connector upon slidably mounting the blank LRU to the dock whereby communicative coupling is maintained across the VDU docking station. The blank LRU may comprise a fiber optic jumper adapted to maintain the communicative coupling.

In yet other aspects of the invention, a serial networking dedicated fiber optic IFE system comprises a first VDU docking station having a VDU slidably mounted therein, a second VDU docking station having a VDU slidably mounted therein and a third VDU docking station having no VDU slidably mounted therein operatively coupled between the first VDU docking station and the second VDU docking station, wherein communicative coupling between the first VDU docking station and the second VDU docking station is maintained across the third VDU docking station. The communicative coupling may be maintained via a switch embedded in the third VDU docking station or a blank LRU slidably mounted in the third VDU docking station.

In the various aspects, the VDU docking station may comprise a nonvolatile memory element communicatively coupled with the first connector and having seat identification information stored thereon.

In the various aspects, the dock is sized to snugly receive the VDU or blank LRU.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIGS. 9A to 9E show a VDU and an associated VDU docking station being slidably engaged in accordance with some embodiments.

FIG. 11 shows an embodiment of a blank LRU having an electrical connector.

FIG. 12 shows an embodiment of a blank LRU having an optical connector.

DETAILED DESCRIPTION OF A PREFERRED EMBODIMENT

Figure 1:
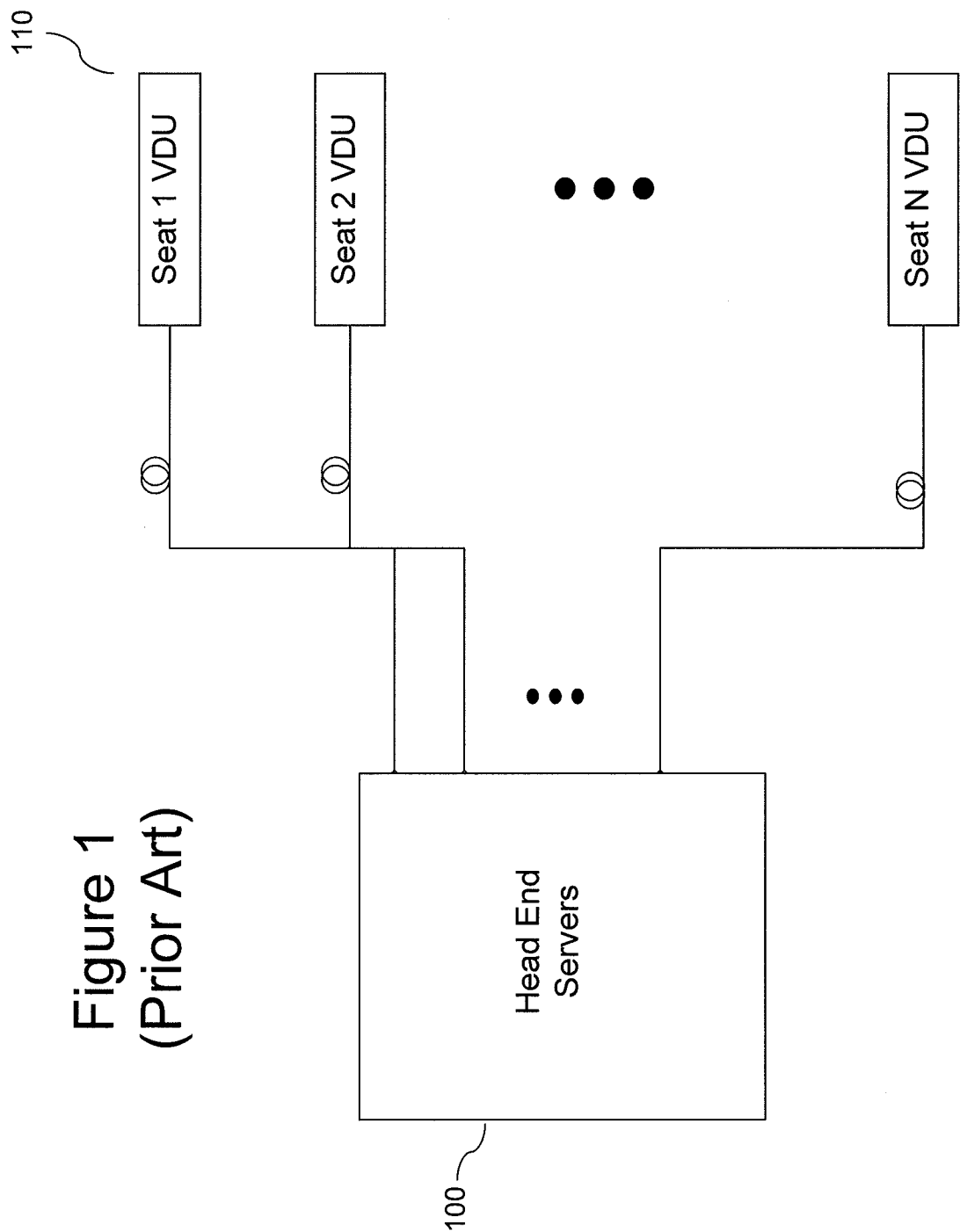
FIG. 1 shows a known dedicated fiber IFE system.
Figure 2:
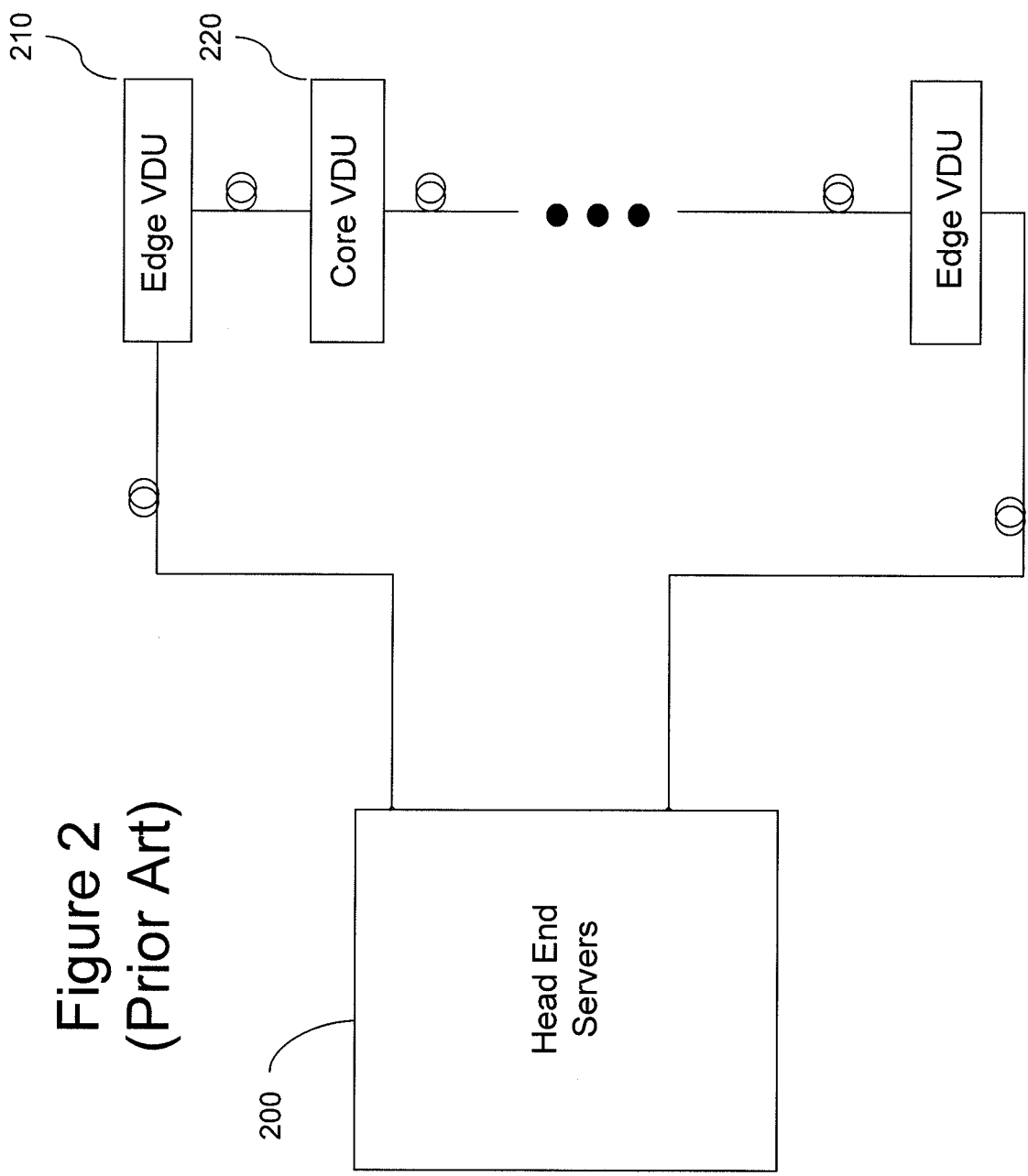
FIG. 2 shows a known serial networking dedicated fiber optic IFE system.
Figure 3:
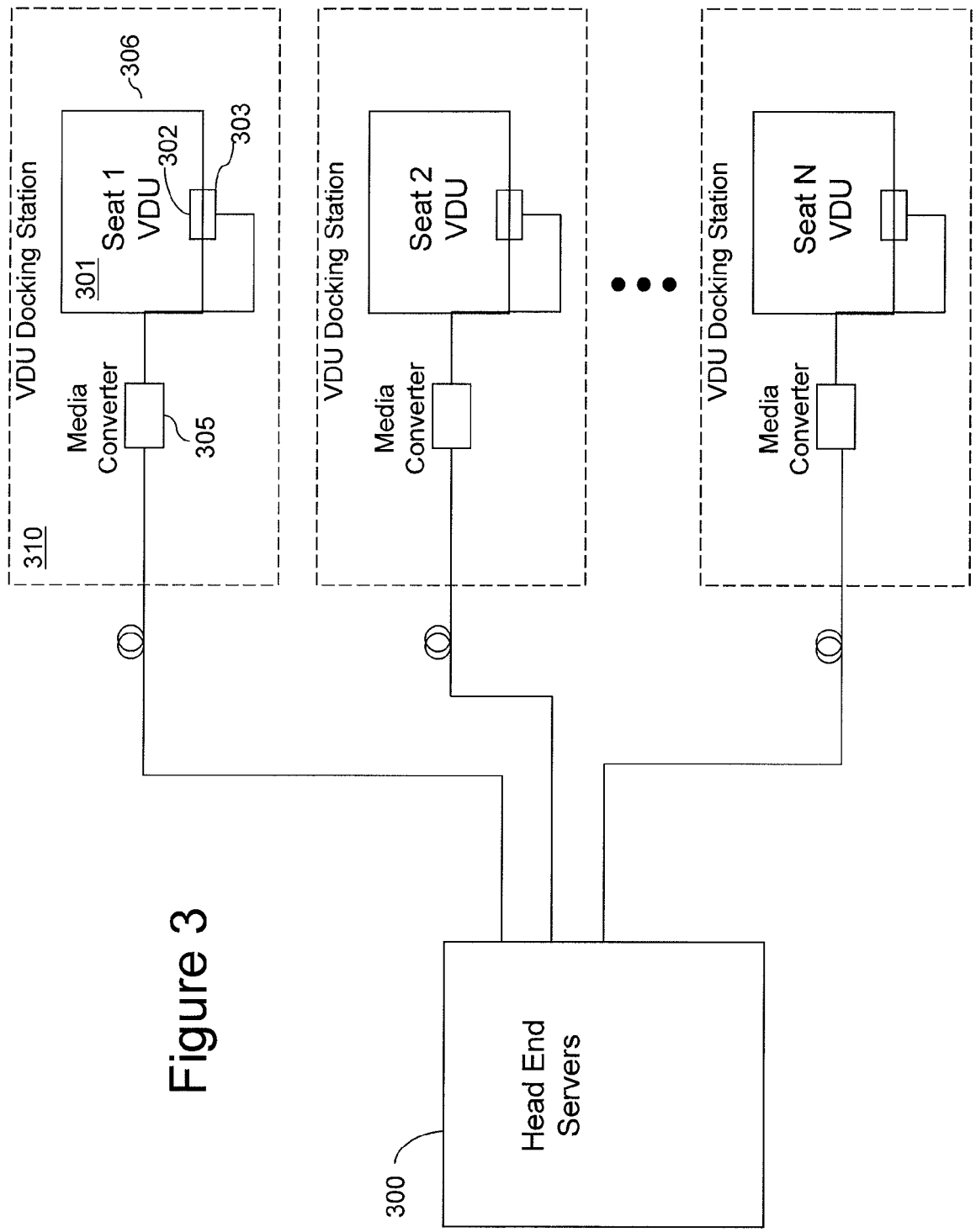
FIG. 3 shows a dedicated fiber optic IFE system having VDU docking stations with electrical connectors in some embodiments of the invention.

FIG. 3 shows an embodiment of a dedicated fiber dedicated fiber optic IFE system having VDU docking stations with electrical connectors. In this embodiment, one or more head end servers 300 communicates with a VDU 301 that is snugly mounted to a dock 306 of a VDU docking station 310 over a communication path that includes a first link, e.g. a single-fiber fiber optic link, that communicatively couples head end servers 300 to a media converter 305 embedded in VDU docking station 310 and a second link, e.g. a wired connection, that communicatively couples media converter 305 to an electrical connector 303 mounted on dock 306. Connector 303 blind mates with an electrical connector 302 mounted on VDU 301 when VDU 301 is slidably mounted to dock 306 to form a VDU docking assembly. Media converter 305 converts physical (PHY) layer optical signals that arrive from head end servers 300 into physical layer electronic signals that are sent to VDU 301 through electrical connector 303, and converts PHY layer electronic signals that arrive from VDU 301 via electrical connector 303 into PHY layer optical signals that are transmitted to head end servers 300. Media converter 305 may utilize an internal two-port switch with internal media access control (MAC) layer connectivity to perform the physical layer conversion.

Figure 4:
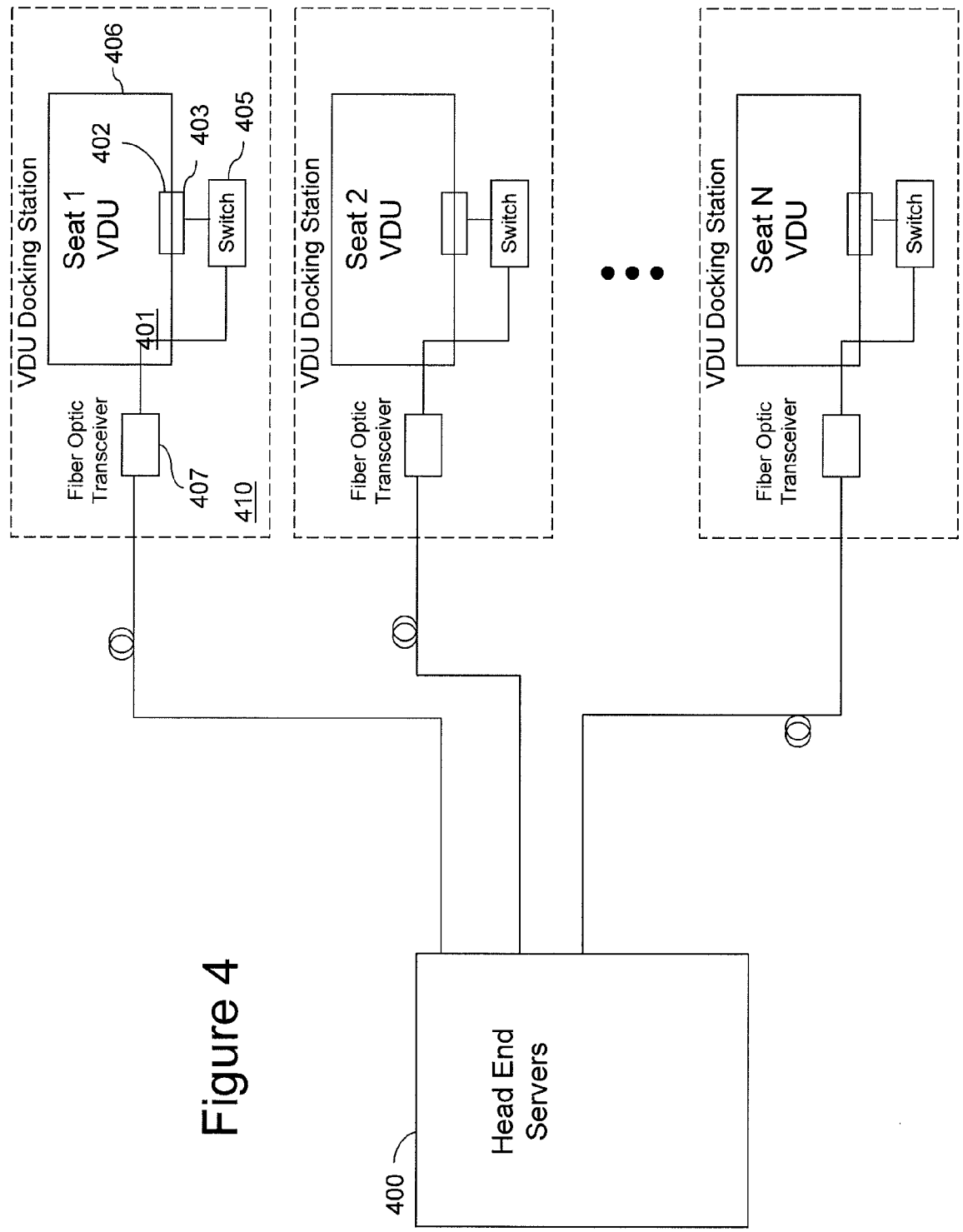
FIG. 4 shows a dedicated fiber optic IFE system having VDU docking stations with electrical connectors in some embodiments of the invention.

FIG. 4 shows another embodiment of a dedicated fiber optic IFE system having VDU docking stations with electrical connectors. In this embodiment, one or more head end servers 400 communicates with a VDU 401 that is snugly mounted to a dock 406 of a VDU docking station 410 over a communication path that includes a first link, e.g. a single-fiber fiber optic link, that communicatively couples head end servers 400 to a fiber optic transceiver 407 embedded in VDU docking station 410, a second link, e.g. a wired connection, that communicatively couples the fiber optic transceiver 407 to a switch 405 embedded in VDU docking station 410 and a third link, e.g. a wired connection, that communicatively couples the switch 405 to a dock-side connector 403 mounted on dock 406. Connector 403 can be configured to blind mate with a VDU-side connector 402 mounted on VDU 401 when VDU 401 is slidably mounted to dock 406 to form a VDU docking assembly. The fiber optic transceiver 407 converts PHY layer optical signals that arrive from head end servers 400 into MAC layer electronic signals that are sent to VDU 401 via switch 405 and connector 403. The fiber optic transceiver 407 converts MAC layer electronic signals arriving from VDU 401 via connector 403 and switch 405 into PHY layer optical signals that are transmitted to head end servers 400. The switch 405 may be connected to VDU 401 at either the MAC or PHY layer.

Figure 5:
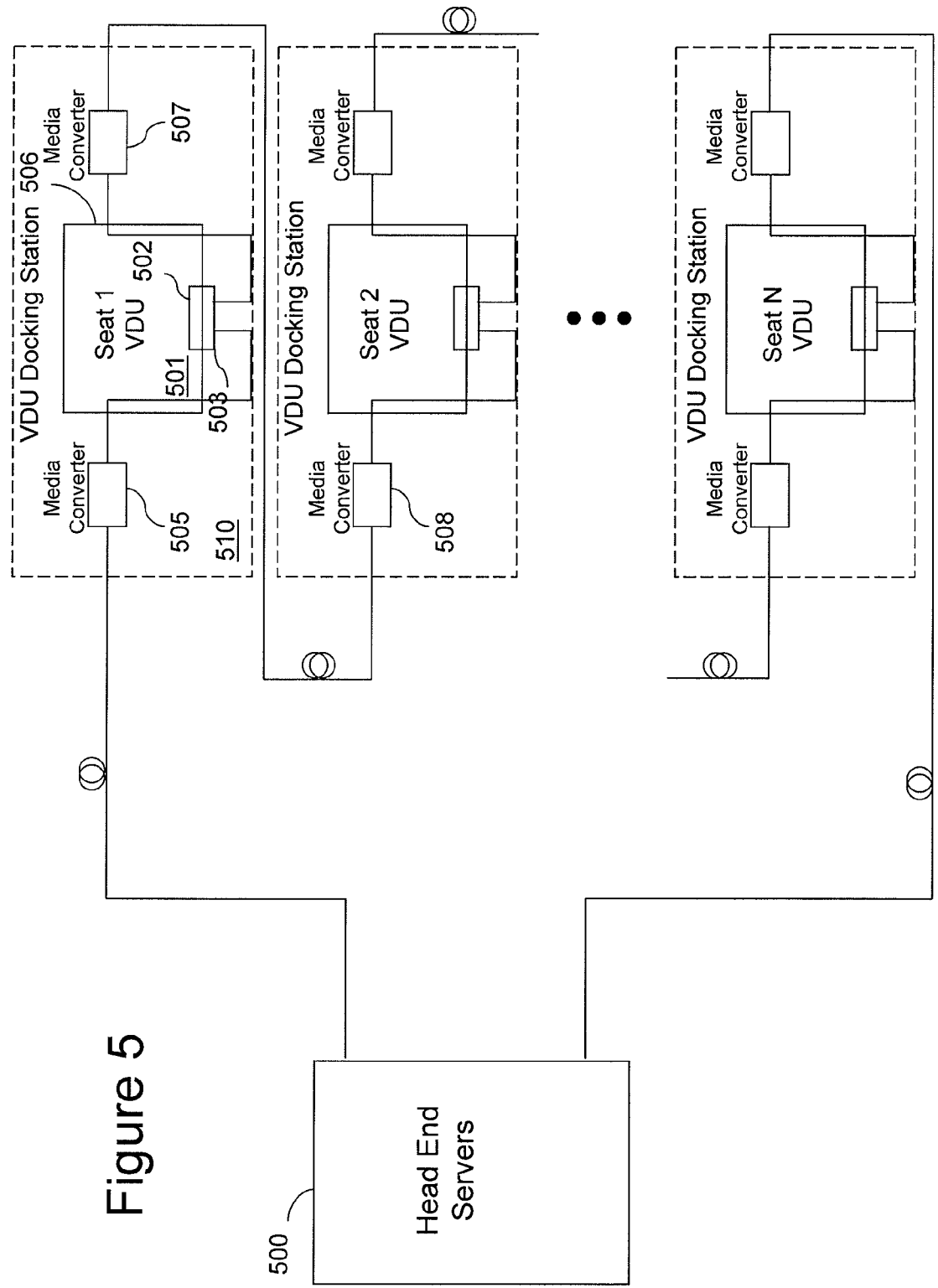
FIG. 5 shows a serial networking dedicated fiber optic IFE system having VDU docking stations with electrical connectors in some embodiments of the invention.

FIG. 5 shows an embodiment of a serial networking dedicated fiber optic IFE system having VDU docking stations with electrical connectors. In this embodiment, one or more head end servers 500 communicates with a VDU 501 at the edge of a serial chain of VDUs over a shared communication path that includes, a first link, e.g. a single-fiber fiber optic link, that communicatively couples head end servers 500 to a media converter 505 embedded in VDU docking station 510 and a second link, e.g. wired connection, that communicatively couples media converter 505 to a dock-side connector 503 mounted on a dock 506 of VDU docking station. VDU 501 is snugly mounted to dock 506. The dock-side connector 503 blind mates with a VDU-side connector 502 mounted on VDU 501 when VDU 501 is slidably mounted to dock 506 to form a VDU docking assembly. The VDU docking assembly is in turn connected to a core VDU docking assembly for a neighboring passenger seat over a communication path that includes a third link, e.g. a wired connection, that communicatively couples connector 503 to a media converter 507 embedded in VDU docking station 510 and fourth link, e.g. a single-fiber fiber optic link, that communicatively couples media converter 507 to one or more neighboring VDU docking assemblies, such as via a neighboring media converter 508. Serial connectivity between adjacent VDU docking assemblies can be repeated to complete a serial chain of VDU docking assemblies. Media converters 505, 507 convert PHY layer optical signals received over fiber links to PHY layer electronic signals which are transmitted to VDU 501 via connector 503, and PHY convert electronic signals that arrive from VDU 501 via connector 503 into PHY layer optical signals that are transmitted to head end servers 500 or adjacent VDUs. Media converters 505, 507 may utilize an internal two-port switch with internal MAC layer connectivity to perform the physical layer conversion. VDU 501 generally has an internal switch (not shown) that routes signals between head end servers 500 and core VDUs.

Figure 6:
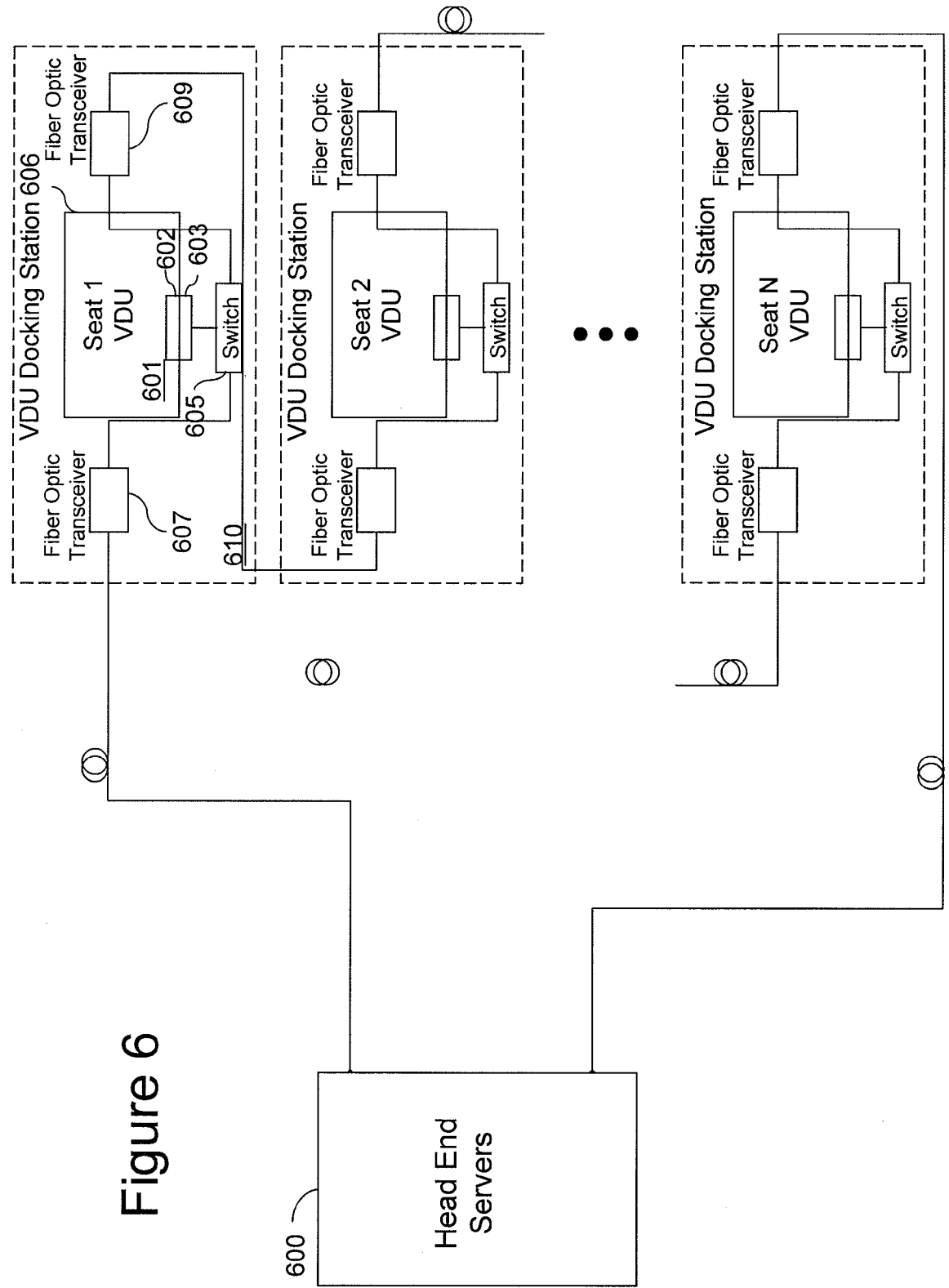
FIG. 6 shows a serial networking dedicated fiber optic IFE system having VDU docking stations with electrical connectors in some embodiments of the invention.

FIG. 6 shows an embodiment of a serial networking dedicated fiber optic IFE system having VDU docking stations with electrical connectors. In this embodiment, one or more head end servers 600 communicates with a VDU 601 at the edge of a serial chain of VDUs over a first communication path, e.g. a single-fiber fiber optic link, that communicatively couples head end servers 600 to a fiber optic transceiver 607 embedded in VDU docking station 610. A second communication path, e.g. a wired connection, communicatively couples transceiver 607 to a switch 605 embedded in VDU docking station 610 and a connection that communicatively couples switch 605 to a dock-side connector 603 mounted on a dock 606 of VDU docking station 610. VDU 601 is snugly mounted to dock 606. Connector 603 blind mates with a VDU-side connector 602 mounted on VDU 601 when VDU 601 is slidably mounted to dock 606 to form a VDU docking assembly. The VDU docking assembly is in turn connected to a core VDU docking assembly for a neighboring passenger seat over a shared communication path that includes a wired connection that communicatively couples connector 603 to switch 605, a wired connection that communicatively couples switch 605 to a fiber optic transceiver 609 embedded in VDU docking station 610 and a single-fiber fiber optic link that communicatively couples transceiver 609 to the core VDU docking assembly of a neighboring passenger seat. This serial connectivity between adjacent VDU docking assemblies can be repeated to realize a serial chain of VDU docking assemblies. Transceivers 607, 609 convert PHY layer optical signals received over fiber links into MAC layer electronic signals, and convert MAC layer electronic signals into PHY layer optical signals that are transmitted to head end servers 600 or core VDUs. Switch 605 may connect to VDU 601 at either the MAC layer or the PHY layer. Switch 605 routes signals between head end servers 600, VDU 601 and core VDUs.

Figure 7:
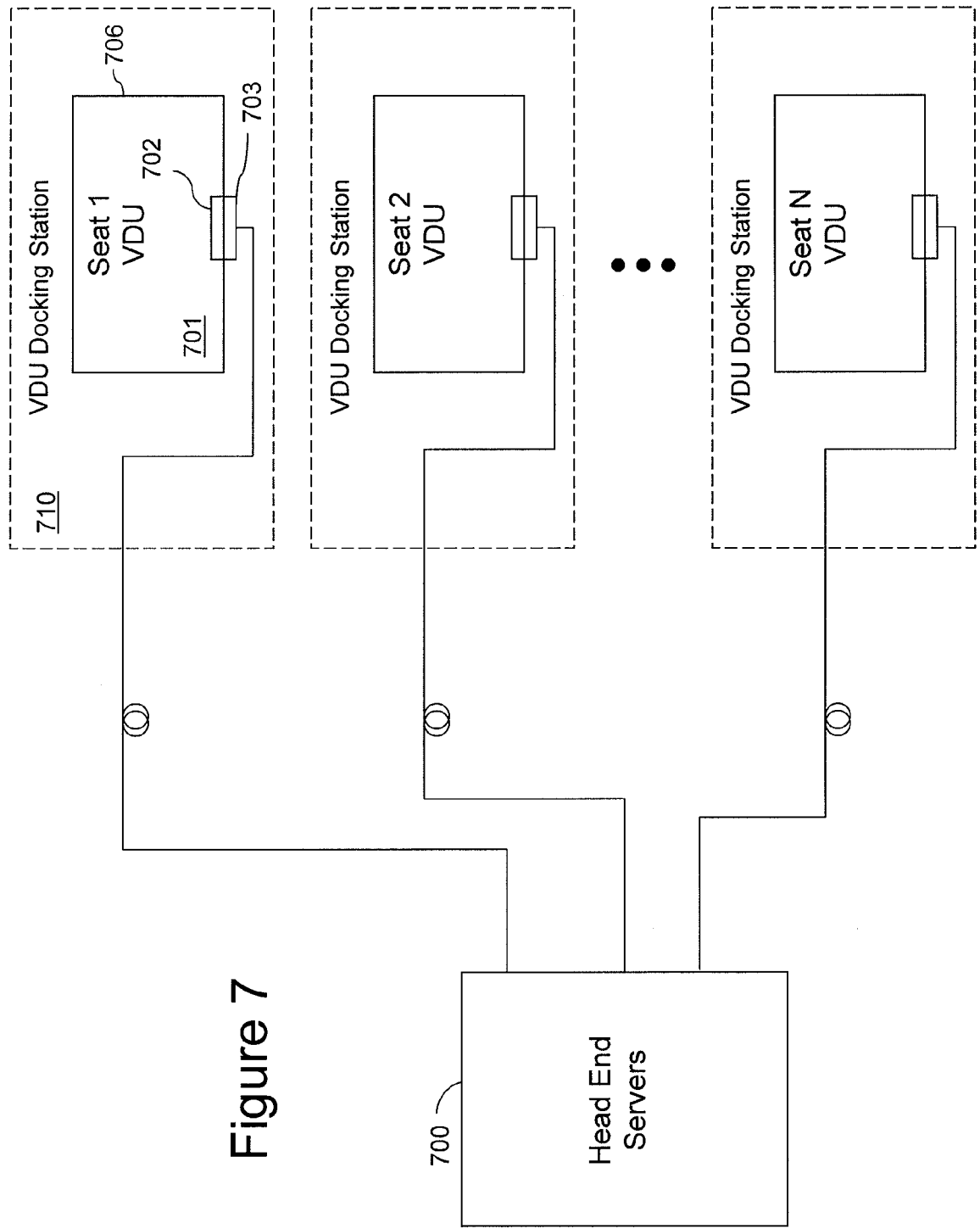
FIG. 7 shows a dedicated fiber optic IFE system having VDU docking stations with optical connectors in some embodiments of the invention.

FIG. 7 shows an embodiment of a dedicated fiber dedicated fiber optic IFE system having VDU docking stations with optical connectors. In this embodiment, one or more head end servers 700 communicates with a VDU 701 that is snugly mounted to a dock 706 of a VDU docking station 710 over a dedicated communication path, e.g. a single-fiber fiber optic link, that communicatively couples head end servers 700 to an optical connector 703 mounted on dock 706. Connector 703 blind mates with an optical connector 702 mounted on VDU 701 when VDU 701 is slidably mounted to dock 706 to form a VDU docking assembly. Connector 703 passes optical signals between head end servers 700 and VDU 701. VDU 701 generally has an internal media converter (not shown) or transceiver for converting inbound PHY layer optical signals into an electronic signal format (PHY or MAC layer) compatible with switch and for converting outbound electronic signals from the switch to PHY layer optical signals.

Figure 8:
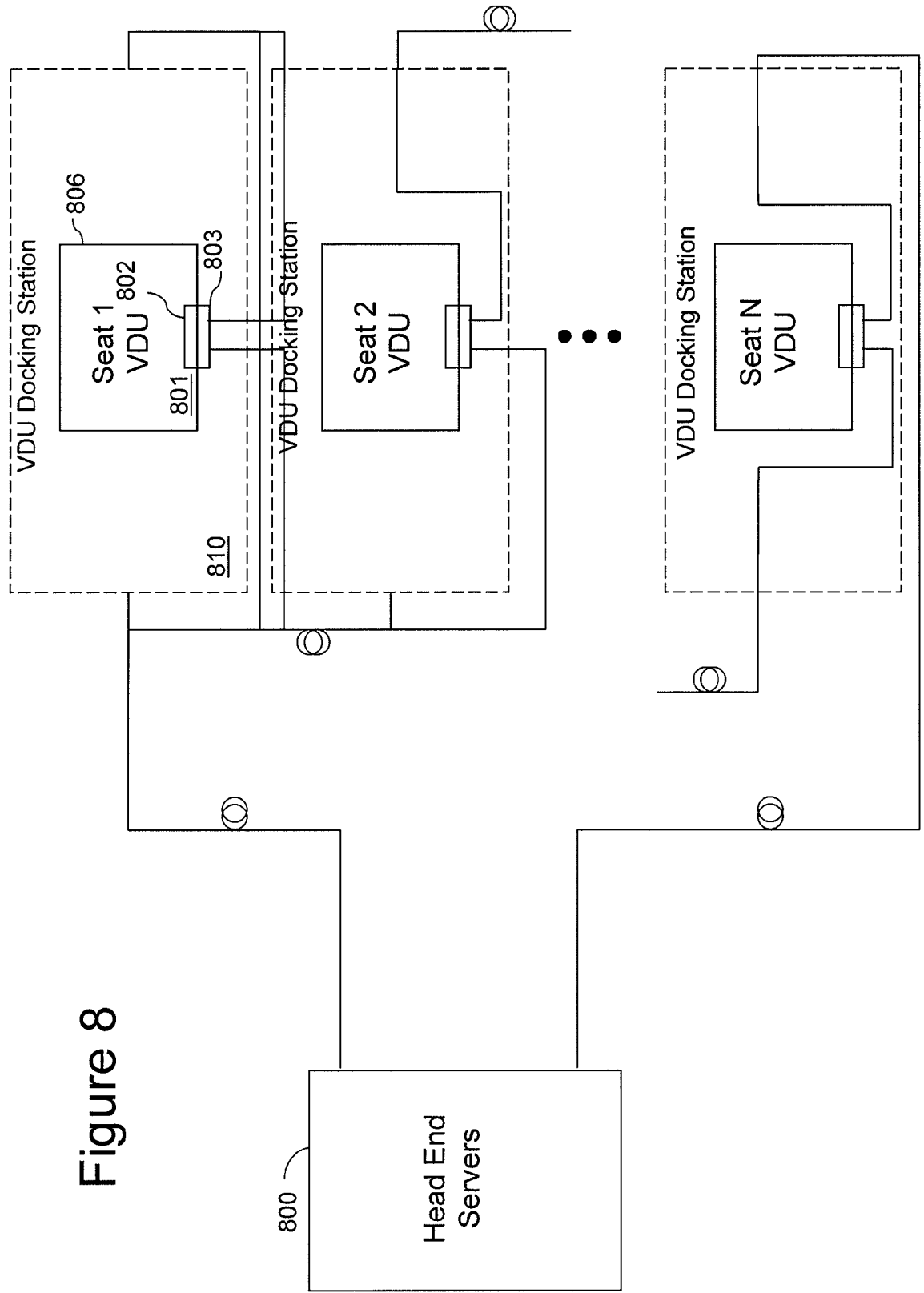
FIG. 8 shows serial networking dedicated fiber optic IFE system having VDU docking stations with optical connectors in some embodiments of the invention.

FIG. 8 shows an embodiment of a serial networking dedicated fiber optic IFE system having VDU docking stations with optical connectors. In this embodiment, one or more head end servers 800 communicates with a VDU 801 at the edge of a serial chain of VDUs. VDU 801 is snugly mounted to a dock 806 of a VDU docking station 810 over a shared communication path, e.g. a single-fiber fiber optic link, that communicatively couples head end servers 800 to an optical connector 803 mounted on dock 806. Connector 803 blind mates with an optical connector 802 mounted on VDU 801 when VDU 801 is slidably mounted in dock 806 to form a VDU docking assembly. The VDU docking assembly is in turn connected to a core VDU docking assembly for a neighboring passenger seat over a single-fiber fiber optic link. This serial connectivity between adjacent VDU docking assemblies is repeated to realize a serial chain of VDU docking assemblies. VDU 801 has an internal media converter (not shown) or transceiver for converting inbound PHY layer optical signals into an electronic signal format (PHY or MAC layer) compatible with internal switch and for converting outbound electronic signals from the internal switch to PHY layer optical signals. Internal switch routes signals between head end servers 800, VDU 801 and core VDUs.

In addition to internal elements identified in the preceding embodiments, a VDU can include one or more processors and one or more user interface elements. Processors include, by way of example, a passenger safety processor and an entertainment processor. User interface elements may include, by way of example, a video display (which may or may not have a touch screen), an audio output jack, an auxiliary input, a credit card reader, a flight attendant call button, a reading light control button, combinations thereof, and the like.

The VDU docking station generally provides power to components in the seating area. For example, the VDU may receive inline power from the VDU docking station. In turn, the media converter, fiber optic transceiver and/or switch embedded in the VDU docking station may receive inline power from the VDU.

VDU mounting and blind mating is achieved in some embodiments by manually inserting a VDU into the docking portion of a VDU docking station until the VDU is received therein, at which point VDU-side connector mounted on the VDU automatically couples with the dock-side connector mounted on the dock.

Various configurations are possible for mounting the VDU 900. FIGS. 9A through 9E illustrate one embodiment of a VDU 900, which is mounted by slidably engaging a VDU docking station mounted to the back of the upper portion of an aircraft seat 930. In the embodiment shown, the VDU docking station comprises a dock 910 and a seat back panel 920. Used herein, "bottom" means the side of the VDU that is nearer to the ground, "top" means the side of the VDU that is farther away from the ground, the "front" of the VDU generally faces a seat occupant, and the "back" of the VDU generally faces a seat.

Figure 9B:
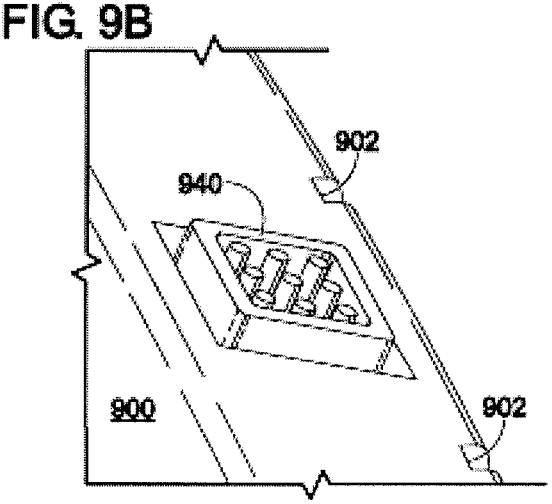
Figure 9D:
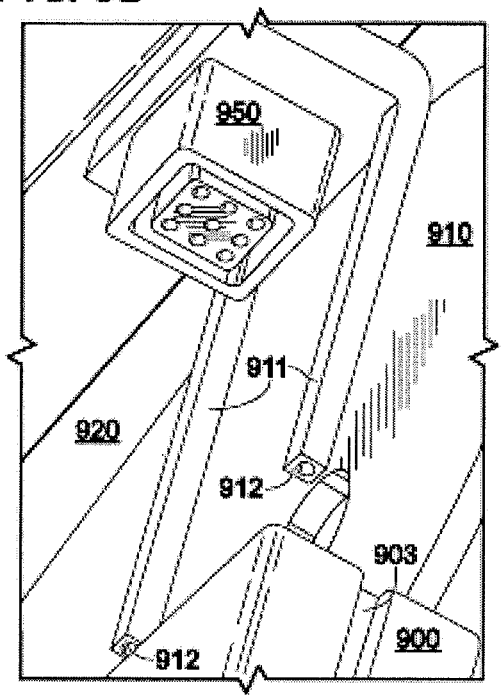
Figure 9E:
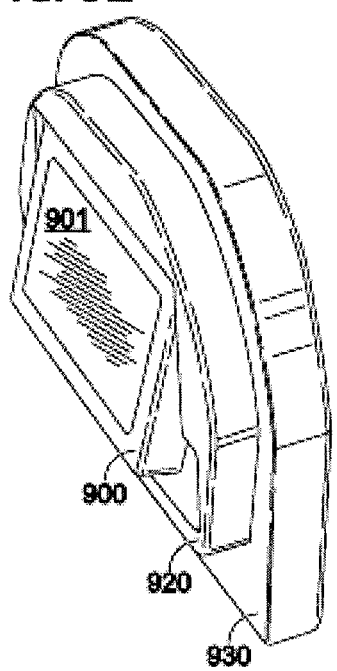

FIG. 9A shows a top down view of VDU 900 with integrated display 901 prior to being slidably mounted in dock 910. FIG. 9C shows a bottom up view of VDU 900 prior to being slidably mounted to dock 910. And, FIG. 9E shows a top down view of VDU 900 after being slidably mounted to dock 910 (hidden behind VDU 900). A plug connector 940 is mounted at the top center of VDU 900. A close up of connector 940 is shown in FIG. 9B. Similarly, a receptacle connector 950 for mating with plug connector 940 is mounted at the top of dock 910. A close up of connector 950 is shown in FIG. 9D.

A rotation mount point 913 of dock 910 mounts to seat back panel 920 to allow dock 910 to rotate such that when VDU 900 is mounted to dock 910 it can be rotated by hand to allow optimal viewing at different head heights. Some installations may require dock 910 be rotated out in order for VDU 900 to clear seat back panel 920 while being slidably mounted or dismounted.

In some embodiments, the VDU 900 has alignment features 903, e.g. grooves, slots, tracks, or the like, on one or both sides. The alignment features 903 can be configured to receive corresponding alignment features 914, e.g. flanges, pins, or the like, on one or more on one or both sides of dock 910 when VDU 900 is being mounted to dock 910. In some embodiments, the VDU 900 has alignment features 902, e.g. grooves, slots, tracks, or the like, on the top and/or bottom. The alignment features 902 can be configured to receive corresponding alignment features 911, e.g. flanges, pins, or the like, on the top and/or bottom of dock 910.

In the embodiment illustrated, when VDU 900 is being slidably mounted, the installer first rotates dock 910 such that its back is parallel to the back of the VDU 900. The installer then slides VDU 900 upward toward receptacle connector 950. Alignment flanges 913 and 911 engage with alignment grooves 903 and 902, respectively, aligning VDU 900 sides and back with dock 910. As plug connector 940 approaches receptacle connector 950, the connectors themselves provide fine alignment to align plug connector 940 pins to receptacle connector 950 holes such that VDU 900 can blind mate with VDU docking station. In some embodiments, plug connector 940 and receptacle connector 950 each have multiple connective elements such that when plug connector 940 and receptacle connector 950 are mated they provide signal connections (optical, electrical, or both) and power connections. Plug connector 940 and/or receptacle connector 950 may provide alignment pins to facilitate blind mating. After VDU 900 is slidably mounted on the VDU docking station, mount screws 916 are inserted through mount holes 904 located at the bottom of VDU 900. The screws align with mount holes 912 located at the ends of alignment flanges 911 when VDU 900 is slidably mounted to dock 910. The screws may be quarter turn fasteners, standard screws, or other quick reliable mount mechanism thus providing a rapid VDU installation and replacement mechanism for an inflight entertainment system.

While in the illustrated embodiment dock 910 takes the form of a rotating bracket that allows for VDU rotation, in other embodiments a dock to which a VDU is slidably mounted may be integral to a seat back panel and may not allow for VDU rotation.

Figure 10:
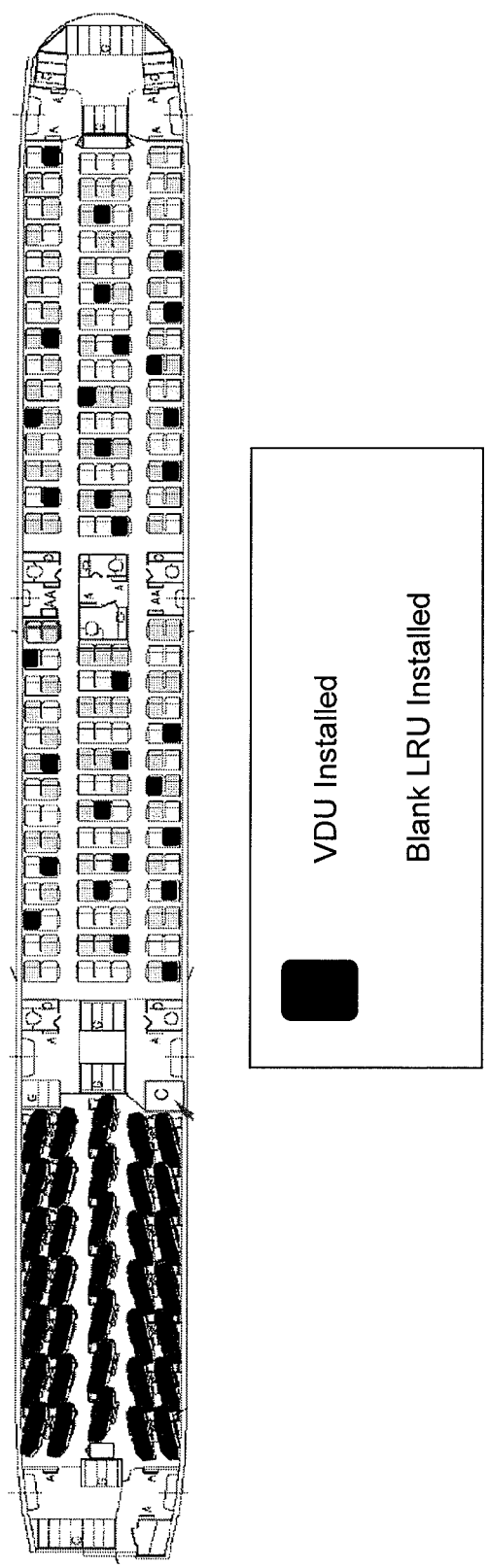
FIG. 10 shows VDU deployment in a serial networking dedicated fiber optic IFE system utilizing blank LRUs in accordance with some embodiments of the invention.

FIG. 10 shows VDU deployment in a serial networking dedicated fiber optic IFE system utilizing blank LRUs in some embodiments. Blank LRUs have no operative user interface elements but sufficient functionality to maintain communicative coupling across the VDU docking station and may be deployed in lieu of VDUs to save costs and support differentiated IFE services. In the illustrated deployment, a Boeing 767 has a two class layout. In first class, all passenger seats have a VDU. However, in economy class, a minority of passenger seats have a VDU, whereas a majority of passenger seats instead have a blank LRU. Economy passengers who want to use the IFE system acquire a VDU from a flight attendant, generally for a fee. The fee generally reduces the number of IFE system users significantly and thus the airline can purchase less than a full shipset of VDU while providing IFE services to passengers willing to pay for them.

FIG. 11 shows a blank LRU 1101 with an electrical connector in some embodiments. Blank LRU 1101 is deployed in a serial networking dedicated fiber optic IFE system akin to the system shown in FIG. 5 with the difference being that some docking stations are populated with blank LRUs instead of VDUs. When blank LRU 1101 is slidably mounted in a dock 1104 of a VDU docking station 1100, an electrical connector 1103 mounted on the blank LRU 1101 blind mates with an electrical connector 1102 mounted on dock 1104 to form a docking assembly. When in the mounted position, blank LRU 1101 has an internal switch 1105 that relays electrical signals between media converters 1107, 1109 via connector 1102 and thereby maintains communicative coupling between neighboring VDUs that are part of a serial chain.

FIG. 12 shows a blank LRU 1201 with an optical connector in some embodiments. Blank LRU 1201 is deployed in a serial networking dedicated fiber optic IFE system akin to the system shown in FIG. 8 with the difference being that some docking stations are populated with blank LRUs instead of VDUs. When blank LRU 1201 is slidably mounted in a dock 1204 of a VDU docking station 1200, an optical connector 1202 mounted on the blank LRU blind mates with an optical connector 1203 mounted on dock 1204 to form a docking assembly. When in the mounted position, blank LRU 1201 has an internal fiber optic jumper 1205 that relays optical signals and thereby maintains communicative coupling between neighboring VDUs that are part of a serial chain.

It bears noting that in the serial networking IFE system shown in FIG. 6, communicative coupling across a VDU docking station that is unpopulated by either a VDU or a blank LRU may be maintained via embedded switch (e.g. 605), which obviates the need to deploy blank LRUs in that system.

In the various embodiments, the dock is sized to snugly receive and retain a VDU or a blank LRU.

It will be appreciated by those of ordinary skill in the art that the invention can be embodied in other specific forms without departing from the spirit or essential character hereof. For example, in some embodiments, a VDU docking station may comprise a nonvolatile memory element and a VDU coupled with the VDU docking station may access seat identification information stored on the nonvolatile memory element. This allows, for example, a replacement VDU coupled with the VDU docking station to discover seat identification information and apply it to provide functionality (e.g. pricing and controls) appropriate for the passenger seat. The present description is therefore considered in all respects to be illustrative and not restrictive. The scope of the invention is indicated by the appended claims, and all changes that come within the meaning and range of equivalents thereof are intended to be embraced therein.

What is claimed is:

1. A video display unit (VDU) docking assembly for an inflight entertainment (IFE) system, comprising:
   a video display unit (VDU) docking station having a dock, a first electrical connector and a converter communicatively coupled with the first electrical connector, the converter being adapted to perform optical-to-electronic conversions on optical signals inbound to the video display unit (VDU) and electronic-to-optical conversions on electronic signals outbound from the video display unit (VDU); and
   a video display unit (VDU) having a second electrical connector, wherein the first electrical connector is adapted to blind mate with the second electrical connector upon slidably mounting the video display unit to the dock.

2. The assembly of claim 1, wherein the converter comprises a media converter.

3. The assembly of claim 1, wherein the converter comprises a fiber optic transceiver.

4. The assembly of claim 1, wherein the converter comprises a fiber optic transceiver and switch.

5. The assembly of claim 1, wherein the converter is adapted to perform physical layer to media access layer and media access layer to physical layer conversions.

6. The assembly of claim 1, wherein the converter receives inline power from the video display unit (VDU).

7. The assembly of claim 1, wherein the video display unit (VDU) receives inline power through the first electrical connector.

8. The assembly of claim 1, wherein the assembly is communicatively coupled with a head end server.

9. The assembly of claim 1, wherein the assembly is serially communicatively coupled between a head end server and a second video display unit (VDU) docking assembly.

10. The assembly of claim 1, wherein the assembly is serially communicatively coupled between a second video display unit (VDU) docking assembly and a third video display unit (VDU) docking assembly.

11. The assembly of claim 1, wherein the video display unit (VDU) docking station comprises a nonvolatile memory element communicatively coupled with the first electrical connector and having seat identification information stored thereon.

12. The assembly of claim 1, wherein the dock is sized to snugly receive the video display unit (VDU).

13. A video display unit (VDU) docking assembly for an inflight entertainment (IFE) system, comprising:
   a video display unit (VDU) docking station having a dock, a first electrical connector and a converter communicatively coupled with the first electrical connector, the converter being adapted to perform optical-to-electronic conversions on optical signals inbound to the video display unit (VDU) and electronic-to-optical conversions on electronic signals outbound from the video display unit (VDU); and
   a blank line replaceable unit (LRU) having a second electrical connector, wherein the first electrical connector is adapted to blind mate with the second electrical connector upon slidably mounting the blank line replaceable unit (LRU) to the dock whereby communicative coupling is maintained across the video display unit (VDU) docking station.

14. The assembly of claim 13, wherein the blank line replaceable unit (LRU) comprises a switch adapted to maintain the communicative coupling.

15. The assembly of claim 13, wherein the dock is adapted to snugly receive the blank line replaceable unit (LRU).

16. A video display unit (VDU) docking assembly for an inflight entertainment (IFE) system, comprising:
   a video display unit (VDU) docking station having a dock, and a first optical connector and a converter communicatively coupled with the first optical connector, the converter being adapted to perform optical-to-electronic conversions on optical signals inbound to the video display unit (VDU) and electronic-to-optical conversions on electronic signals outbound from the video display unit (VDU); and
   a blank line replaceable unit (LRU) having a second optical connector, wherein the first optical connector is adapted to blind mate with the second optical connector upon slidably mounting the blank line replaceable unit (LRU) to the dock whereby communicative coupling is maintained across the video display unit (VDU) docking station.

17. The assembly of claim 16, wherein the blank line replaceable unit (LRU) comprises a fiber optic jumper adapted to maintain the communicative coupling.

18. The assembly of claim 17, wherein the dock is adapted to snugly receive the blank line replaceable unit (LRU).

19. An inflight entertainment (IFE) system, comprising:
   a first video display unit (VDU) docking station having a first video display unit (VDU) slidably mounted therein;
   wherein the first video display unit (VDU) docking station comprises a dock, a first electrical connector and a converter communicatively coupled with the first electrical connector, the converter being adapted to perform optical-to-electronic conversions on optical signals inbound to the first video display unit (VDU) and electronic-to-optical conversions on electronic signals outbound from the first video display unit (VDU);
   wherein the first video display unit (VDU) has a second electrical connector, wherein the first electrical connector is adapted to blind mate with the second electrical connector upon slidably mounting the first video display unit (VDU) to the dock;
   a second video display unit (VDU) docking station having a second video display unit (VDU) slidably mounted therein; and
   a third video display unit (VDU) docking station having no video display unit (VDU) slidably mounted therein operatively coupled between the first video display unit (VDU) docking station and the second video display unit (VDU) docking station, wherein communicative coupling between the first video display unit (VDU) docking station and the second video display unit (VDU) docking station is maintained across the third video display unit (VDU) docking station.

20. The system of claim 19, wherein the communicative coupling is maintained via a switch embedded in the third video display unit (VDU) docking station.

21. The system of claim 19, wherein the communicative coupling is maintained via a blank line replaceable unit (LRU) slidably mounted in the third video display unit (VDU) docking station.

* * * * *